United States Patent [19]

Lautzenheiser

[11] 3,716,090
[45] Feb. 13, 1973

[54] GARDEN SHREDDER WITH VARIABLE POSITION LOADING CHUTE

[75] Inventor: Robert D. Lautzenheiser, Bluffton, Ind.

[73] Assignee: The Red Cross Manufacturing Corp.

[22] Filed: April 7, 1972

[21] Appl. No.: 242,043

[52] U.S. Cl ............................ 56/501, 241/186 R, 56/12.8, 241/101.7
[51] Int. Cl. ........................... B26d 4/28, B02c 18/00
[58] Field of Search ...... 146/124, 192, 107; 241/186; 56/501, DIG. 8, 12.8

[56] References Cited

UNITED STATES PATENTS 3,412,770    11/1968    Johnson ............................. 146/192

*Primary Examiner*—Willie G. Abercrombie
*Attorney*—Robert C. Brown, Jr. et al.

[57] ABSTRACT

A loading chute for shredders of the type used to shred lawn materials. A loading hopper is arranged with the inlet opening of the shredder for movement between an upright position and a lower position wherein material to be shredded can be swept up the chute and into the shredder. A damper is arranged with the chute to act as a guard.

7 Claims, 6 Drawing Figures

PATENTED FEB 13 1973

PATENTED FEB 13 1973 3,716,090

PATENTED FEB 13 1973

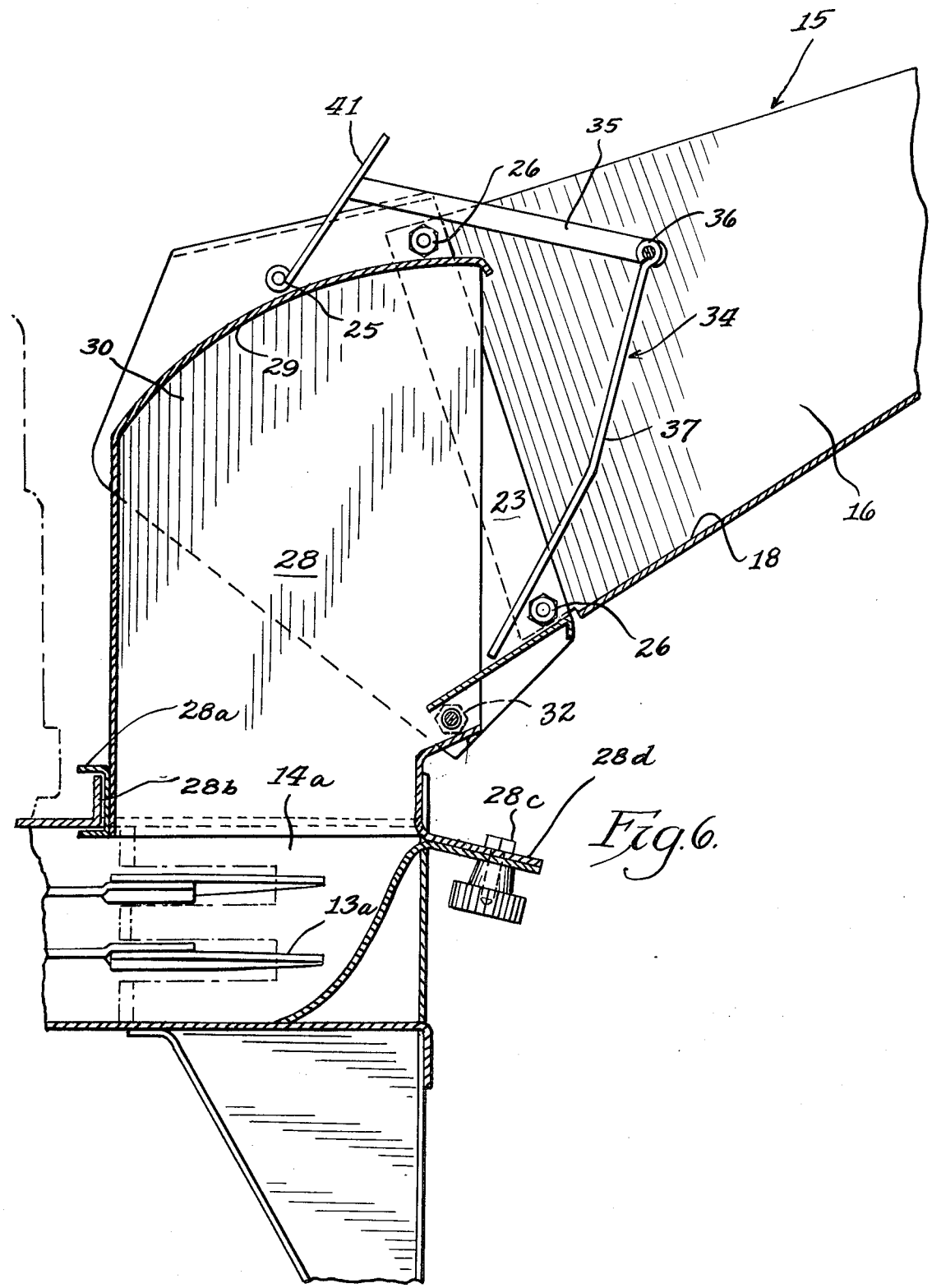

GARDEN SHREDDER WITH VARIABLE POSITION LOADING CHUTE

The present invention is directed to shredding machines of the type used to shred leaves, prunings and the like, and is particularly directed to loading facilities for shredders. The major purposes of the present invention are to create loading facilities which may be selectively utilized as a feed hopper over an inlet opening to a shredder or as an inclined feed ramp leading from the ground into the inlet opening of the shredder, to provide simple and positive means to couple such a ramp to a shredder, to provide simple means for deterring accidental placement of a person's hand or foot within the inlet opening of the shredder, to provide a guard to restrict "blowback" of material toward the user, to arrange such a hopper that an operator can easily utilize the end of the chute remote from the shredder for lifting the shredder for transport in wheelbarrow fashion from place to place, and to enable simple and economical manufacture of such hoppers.

These and other purposes will become more apparent in the course of the ensuing specification and claims, when taken with the accompanying drawings, in which:

FIG. 6 is a sectional view of a hopper mounting housing coupled to the shredder.

Like elements are designated by like characters throughout the specification and drawings.

Figure 1:
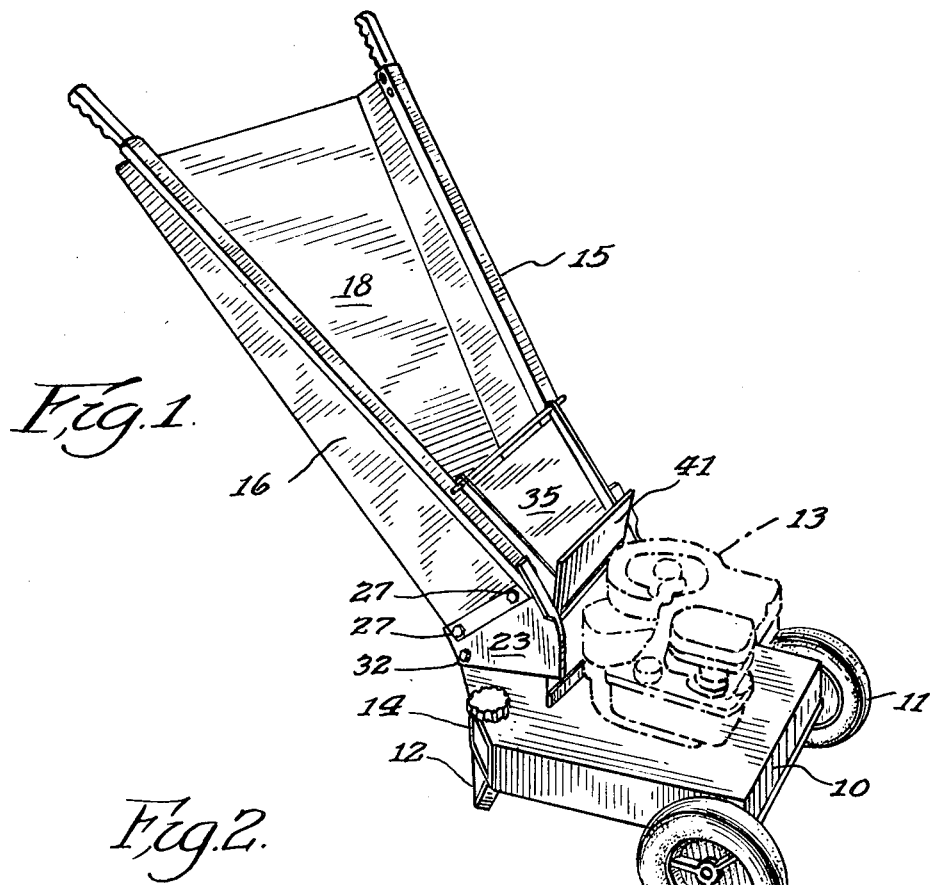
FIG. 1 is a perspective view of the invention.

With specific reference now to the drawings, and in the first instance to FIG. 1, the numeral 10 designates a shredding compartment which is ground supported by a pair of spaced wheels 11 at the forward end of the compartment. A stand 12 is fixed to the lower rear end of the shredding compartment to allow the shredder to rest at a selected position on the ground. A motor 13 is supported on the upper wall of the compartment and has its drive shaft generally vertically disposed so as to drive shredding knives 13a (FIG. 6) within compartment 10. An outlet passage 14 is formed at the rear of the compartment and is adjacent to an inlet or feed passage 14a. Shredders of this type are described in my U.S. Pat. No. 3,593,930. The shredding housing or compartment may be formed as disclosed in my copending application, Ser. No. 132,657, filed Apr. 9, 1971.

In accordance with the present invention, a loading hopper generally designated at 15 is associated with the inlet 14a so as to feed materials to be shredded, such as leaves, twigs, and the like, into the shredding compartment. The loading hopper 15 is defined by a metal stamping formed to provide spaced side walls 16 and 17 which are joined by a bottom wall 18. The side walls and bottom wall diverge outwardly from the shredder when viewed in plan. Side walls 16 and 17 have a major height at the forward end of the hopper and taper to a lower height at the rear. The upper edges of the side walls 16 and 17 may be rolled as at 19 and 20.

These rolled portions carry spaced handles 21 and 22 which are fixed therein as by bolts and extend outwardly therefrom.

The forward end of the loading hopper 15 is connected to a hinge plate assembly, which consists of spaced plates 23 and 24 which are spanned by a rod 25. The hinge plate assembly is fixed to the forward end of the loading hopper as by means of bolts and nuts 26 and 27. Plates 23 and 24 fit within the U shape defined at the forward end of the loading hopper.

The side plates 23 and 24 of the hinge plate assembly are adapted to embrace the sides of an inlet housing 28. Inlet housing 28 is formed with a curvilinear upper wall 29 and side walls 30 and 31. The rear and bottom of the housing are open so as to receive material from the hopper and direct it to the inlet opening 14a.

The hinge plate assembly and the hopper fixed thereto are pivotally connected to the inlet housing 28 as by means of pivot bolts 32. A nut 33 with an enlarged handle thereon is threadedly engaged with one end of the rod 25 and, upon tightening of the same, will cause contracting of the plates 23 and 24 against the side walls 30 and 31 and frictionally lock the load hopper and hinge assembly in a selected position of pivotal adjustment relative to the inlet housing 28.

Inlet housing 28 is fixed over the inlet 14a to the shredder. A channel 28a is fixed to the front wall and embraces a flange 28b of the shredder top wall at the forward side of the inlet opening. The rear of the housing is bolted as at 28c to the inclined feed plate 28d in the inlet.

A damper assembly generally designated at 34 is defined by a first plate 35 carrying a hinge pin 36 which in turn carries a plurality of plates 37, 38 and 39 which are positioned side by side and adapted for swinging movement about the axis of the hinge pin 36. The combined width of the plates 37, 38 and 39 is slightly less than the span between the side walls 16 and 17 of the hopper and their length is greater than the depth of the hopper. Plate 35 is swingably mounted on the hinge plate assembly by means of a cylindrical portion 40 of a plate 41 to which plate 35 is fixed. Portion 40 receives the bolt 25 whereby the damper assembly is pivotally mounted on the hinge plate assembly. The plate 41 extends upwardly with respect to the plate 35 to define a manipulating portion.

The damper assembly thus defined may be swung to a position (FIGS. 1 and 6) wherein the plates 37, 38 and 39 mask the opening from the hopper to the oppositely facing opening of the inlet housing. In this position the plates 37, 38 and 39 may swing inwardly individually or as a unit about the axis of the hinge 36 and toward the shredder inlet to allow movement of materials into the inlet housing. Unless positively swung by forcible engagement with materials being fed into the housing, the plates 37, 38 and 39 will rest upon the bottom wall 18 to thus mask and guard the inlet opening of the housing 28 from the user. In this position, the plates also impede "blowback" of material toward the user.

Figure 2:
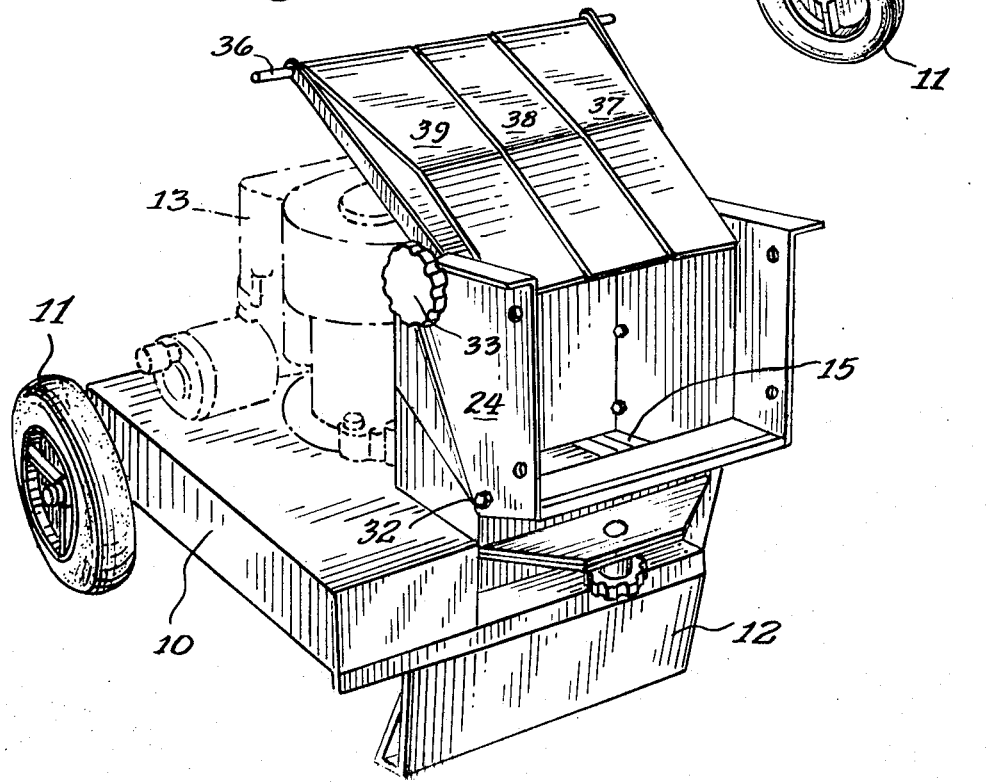
FIG. 2 is a rear perspective view of a portion of the shredder assembly illustrated in FIG. 1.
Figure 3:
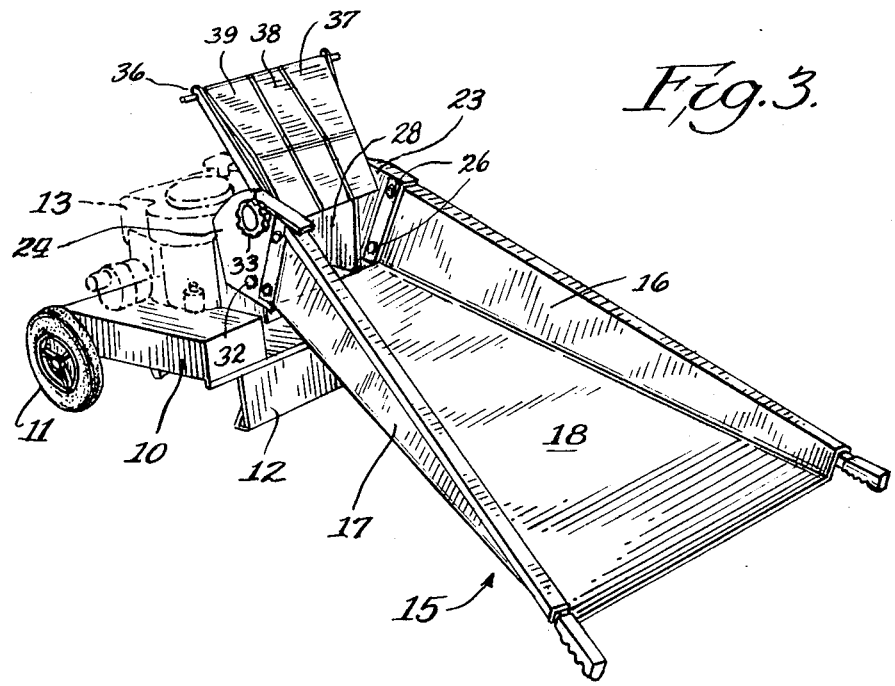
FIG. 3 is another perspective view of the shredder illustrated in FIG. 1 while illustrating a different operative position.

The damper assembly may also be swung upwardly to an upper position as is illustrated in FIGS. 2 and 3. In this position plate 41 abuts against housing 28 and disposes both the plate 35 and plates 37, 38 and 39 at an upwardly and forwardly disposed angle relative to the loading chute. In this upper position, the plates extend partially across the inlet opening to housing 28 to restrict "blowback."

The loading hopper assembly and inlet housing are adapted for use in plural positions of adjustment. The loading hopper may be swung to an upwardly and rearwardly inclined position as illustrated in FIG. 1 through loosening of the lock nut 33 followed by tightening of this nut in the selected position of adjustment. In this position debris to be shredded may simply be dumped into the load hopper.

The load hopper may also be utilized as illustrated in FIG. 3 wherein the rear end of the load hopper rests upon the ground. Debris may then be swept or raked into the hopper or up the hopper and through the inlet housing to the inlet 14a of the shredder.

The hinge plate assembly is also formed so that the load hopper may be adjusted to an essentially upright position (not illustrated in the drawings).

Figure 5:
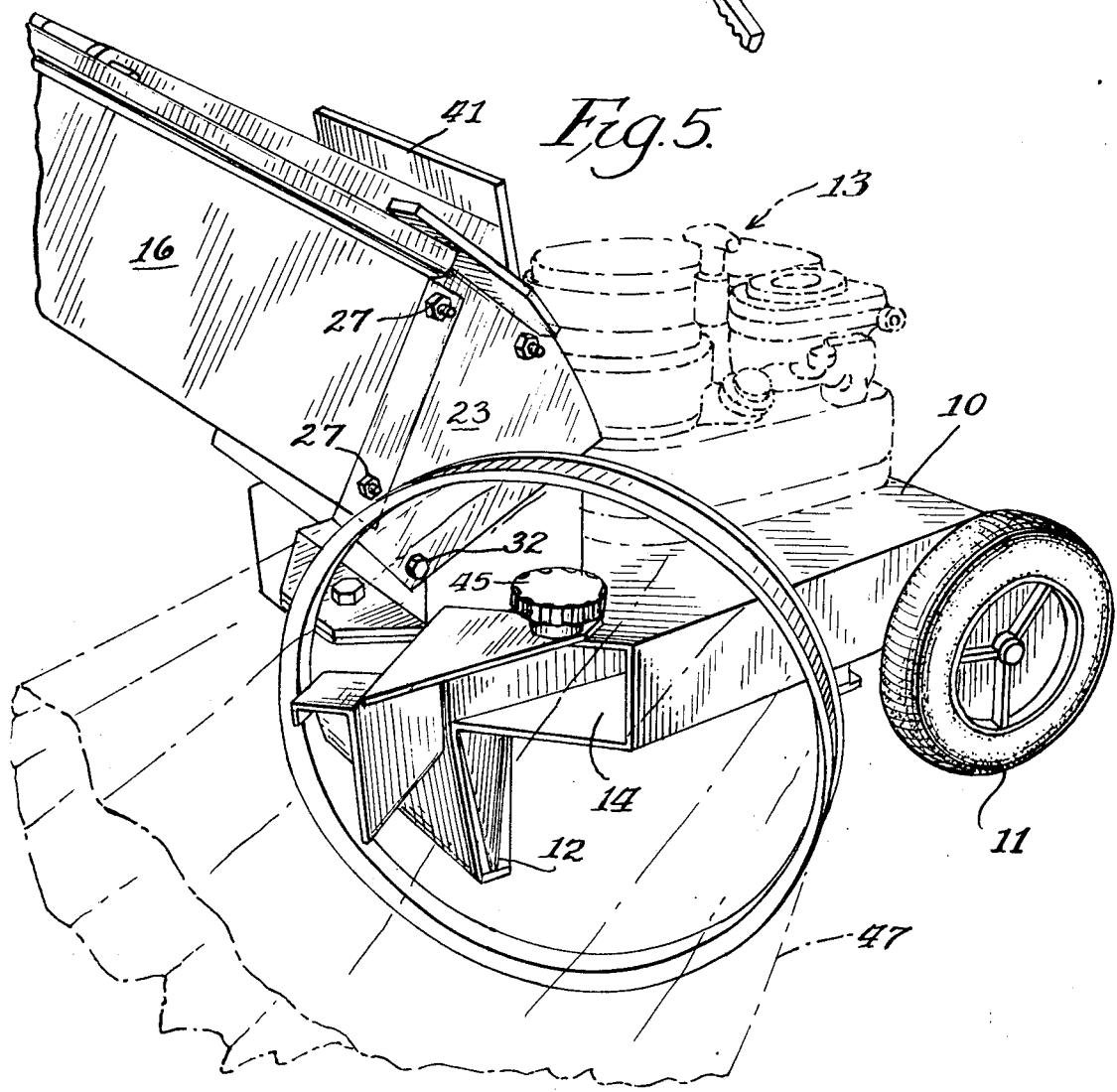
FIG. 5 is another perspective view of the invention while illustrating a bagging attachment utilized with the invention.
Figure 4:
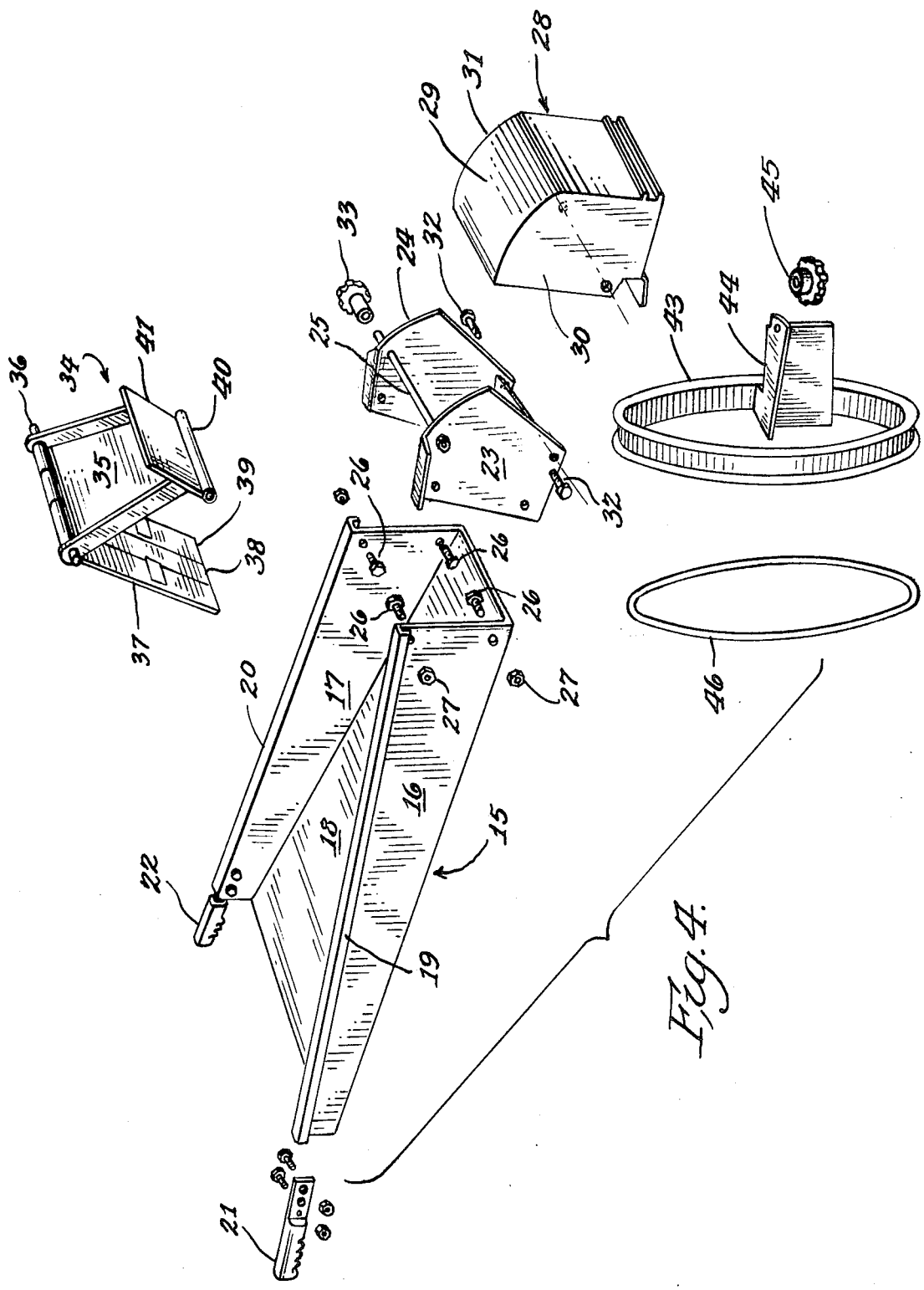
FIG. 4 is an exploded view of loading chute facilities utilized with the shredder of FIGS. 1–3.

The invention also contemplates the use of a bagging attachment for the shredder and load hopper facilities. To this end an annular ring 43 is adapted to be fixed in a position surrounding the outlet opening 14 through means of a bracket 44 which is fixed to the ring. Bracket 44 is adapted to be fixed to the upper wall of the outlet opening through means of a lock nut 45. A flexible O-ring 46 or the like may be used to clamp a bag illustrated in phantom at 47 in FIG. 5 to the ring.

I claim:

1. A shredding machine including a wheel supported shredding compartment having shredding knives therein and power means for rotating said knives, said shredding compartment having an inlet opening formed in an upper wall thereof and an outlet opening formed through a side wall thereof, flow directing means positioned over said inlet and having a rearwardly facing inlet, a feed hopper pivotally mounted on said directing means, said hopper being mounted for movement between a position extending upwardly relative to said compartment and a position downwardly and laterally inclined from said compartment, said hopper being defined by a U-shaped trough, and means for selectively holding said hopper in both positions.

2. The structure of claim 1 wherein said hopper is movable to an upright position over said compartment inlet opening and to a position extending upwardly and laterally from said compartment inlet opening.

3. The structure of claim 1 wherein said flow directing means is defined by a rearwardly and downwardly open housing, said holding means including plates carried by said hopper and embracing side walls of said housing, and means for clamping said plates against said side walls.

4. The structure of claim 1 wherein said hopper has manipulating handles extending outwardly therefrom.

5. The structure of claim 1 wherein said hopper includes a damper pivotally mounted thereon and extending across the flow space through said hopper.

6. The structure of claim 5 wherein said damper is pivotally mounted on a member pivotally mounted on said hopper to enable selective positioning of the pivot axis of said damper relative to said hopper and in positions fully masking and partially masking the flow space through said hopper.

7. The structure of claim 6 wherein said damper is defined by a plurality of plates positioned side by side.

* * * * *